US012760734B2

(12) United States Patent
Lee et al.

(10) Patent No.: US 12,760,734 B2
(45) Date of Patent: Oct. 13, 2026

(54) CONNECTOR ASSEMBLY FOR SCROLL COMPRESSOR

(71) Applicant: Carrier Corporation, Palm Beach Gardens, FL (US)

(72) Inventors: KeonWoo Lee, Manlius, NY (US); Ping Vang, Liverpool, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 19/022,608

(22) Filed: Jan. 15, 2025

(65) Prior Publication Data

US 2025/0230814 A1 Jul. 17, 2025

Related U.S. Application Data

(60) Provisional application No. 63/621,712, filed on Jan. 17, 2024.

(51) Int. Cl.
*F04C 29/12* (2006.01)
*F16L 19/025* (2006.01)
*F04C 18/02* (2006.01)

(52) U.S. Cl.
CPC ............ *F04C 29/12* (2013.01); *F16L 19/025* (2013.01); *F04C 18/0207* (2013.01)

(58) Field of Classification Search
CPC ..................................................... F16L 19/025
See application file for complete search history.

(56) References Cited

U.S. PATENT DOCUMENTS 2,226,826 A * 12/1940 Miller .................. F16L 19/025 285/275
3,879,070 A * 4/1975 Russ ...................... F16L 19/12 285/382.7
4,606,706 A 8/1986 Utter
5,131,695 A 7/1992 Wiser
(Continued)

FOREIGN PATENT DOCUMENTS

CN 202108685 U 1/2012
CN 106884776 B 2/2020
(Continued)

OTHER PUBLICATIONS

Extended European Search Report received for EP Application No. 25151803.1, mailed on Jun. 10, 2025, 8 Pages.

*Primary Examiner* — Matthew Troutman
*Assistant Examiner* — James A Linford
(74) *Attorney, Agent, or Firm* — Souad Hakim

(57) ABSTRACT

A connector assembly for a scroll compressor comprises an adaptor having a first end configured to be attached to an outer surface of the compressor at one or more ports of the compressor such that a longitudinally extending bore-hole of the adaptor remains in line and fluidically connected to the corresponding port, and a first tube extending coaxially through the bore-hole of the adaptor via a second end of the adaptor such that a first end of the first tube extends at least partially within an inner chamber of the compressor via the corresponding port and a second end of the first tube extends at least partially outside of the second end of the adaptor, wherein a connecting end of a conduit to be fluidically connected to the corresponding port is configured to be coaxially connected to the second end of the first tube.

16 Claims, 5 Drawing Sheets

(56) References Cited

U.S. PATENT DOCUMENTS

| | | | |
|---|---|---|---|
| 7,097,435 B2 | 8/2006 | Erisgen et al. | |
| 7,147,444 B2 | 12/2006 | Cheon | |
| 9,051,934 B2 | 6/2015 | Fraser | |
| 9,157,439 B2 | 10/2015 | Brostrom et al. | |
| 10,995,974 B2 | 5/2021 | Piscopo et al. | |
| 12,372,172 B1 * | 7/2025 | Westerfield | F16L 19/0206 |
| 2009/0110586 A1 | 4/2009 | Brabek et al. | |
| 2014/0212307 A1 | 7/2014 | Hix et al. | |
| 2014/0286753 A1 | 9/2014 | Maganhoto et al. | |
| 2020/0149665 A1 * | 5/2020 | Dirneder | F16L 17/06 |
| 2022/0412359 A1 | 12/2022 | Bonnefoi et al. | |

FOREIGN PATENT DOCUMENTS

| | | | |
|---|---|---|---|
| CN | 112761930 | A | 5/2021 |
| CN | 112128082 | B | 3/2022 |
| JP | 5056399 | B2 | 10/2012 |
| KR | 10-0972281 | B1 | 7/2010 |
| WO | 2016039042 | A1 | 3/2016 |

* cited by examiner

CONNECTOR ASSEMBLY FOR SCROLL COMPRESSOR

CROSS-REFERENCE TO RELATED APPLICATION

This patent application claims the benefit of U.S. Provisional Patent Application No. 63/621,712, filed on Jan. 17, 2024, which is incorporated by reference herein in its entirety.

BACKGROUND

The subject disclosure relates to the field of scroll compressors, and more particularly, to a connector assembly for scroll compressors, which facilitates the connection of pipes/conduits to one or more ports of the scroll compressor.

SUMMARY

Described herein is a connector assembly for a scroll compressor. The assembly comprises an adaptor having a first end configured to be attached to an outer surface of the scroll compressor at one or more ports of the scroll compressor such that a longitudinally extending bore-hole of the adaptor remains in line and fluidically connected to the corresponding port, and a first tube extending coaxially through the bore-hole of the adaptor via a second end of the adaptor such that a first end of the first tube extends at least partially within an inner chamber of the scroll compressor via the corresponding port and a second end of the first tube extends at least partially outside of the second end of the adaptor, wherein a connecting end of a conduit to be fluidically connected to the corresponding port is configured to be coaxially connected to the second end of the first tube and further secured to the first tube and the adaptor using a fastener.

In one or more embodiments, the one or more ports comprise a suction port, wherein the conduit is associated with and fluidically connected to a service valve.

In one or more embodiments, the one or more ports comprise a vapor injection port, wherein the conduit is associated with and fluidically connected to an economizer.

In one or more embodiments, the conduit is assembled to the adaptor using a flare nut.

In one or more embodiments, the adaptor comprises a housing that is rotationally symmetric about a longitudinal axis of the adaptor and having the bore-hole extending along the longitudinal axis between the first end and the second end of the housing.

In one or more embodiments, the fastener is a flare nut that is rotatably configured around the connecting end of the conduit.

In one or more embodiments, the second end of the adaptor comprises an external thread and the flare nut comprises an internal thread adapted to rotatably engage and be fastened to the external threads of the adaptor to secure the conduit to the first tube and the adaptor.

In one or more embodiments, the conduit is fluidically connected and secured to the corresponding port using the flare nut such that the flare nut and/or the second end of the adaptor encloses a connection point between the conduit and the first tube.

In one or more embodiments, the connector assembly comprises a second tube of a first predefined length coaxially disposed within the first end of the first tube, wherein the second tube is configured to be expanded within the first tube and correspondingly keep the first tube in contact with a rim of the corresponding port to create a leak-proof connection between the rim and the first tube.

In one or more embodiments, the second tube is made of a metal.

In one or more embodiments, the connector assembly comprises a third tube of a second predefined length coaxially disposed in a gap between an outer surface of the second end of the first tube and the second end of the adaptor, and the connected conduit to create a leak-proof connection between the first tube, the adaptor, and the conduit.

In one or more embodiments, the third tube extends at least partially within the bore-hole of the adaptor and the connected conduit.

In one or more embodiments, the third tube is made of copper, wherein the third tube is brazed to the conduit, the first tube, and the adaptor.

In one or more embodiments, the connecting end of the conduit is coaxially connected to the second end of the first tube, such that the second end of the first tube extends at least partially within the conduit.

In one or more embodiments, the adaptor is made of stainless steel.

In one or more embodiments, the first end of the adaptor is welded to the outer surface of the scroll compressor at the one or more ports of the scroll compressor.

In one or more embodiments, the first end of the adaptor comprises a raised portion that is configured to be welded to the outer surface of the scroll compressor at the one or more ports of the scroll compressor.

The foregoing summary is illustrative only and is not intended to be in any way limiting. In addition to the illustrative aspects, embodiments, and features described above, further aspects, embodiments, features, and techniques of the subject disclosure will become more apparent from the following description taken in conjunction with the drawings.

BRIEF DESCRIPTION OF THE DRAWINGS

The accompanying drawings are included to provide a further understanding of the subject disclosure and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
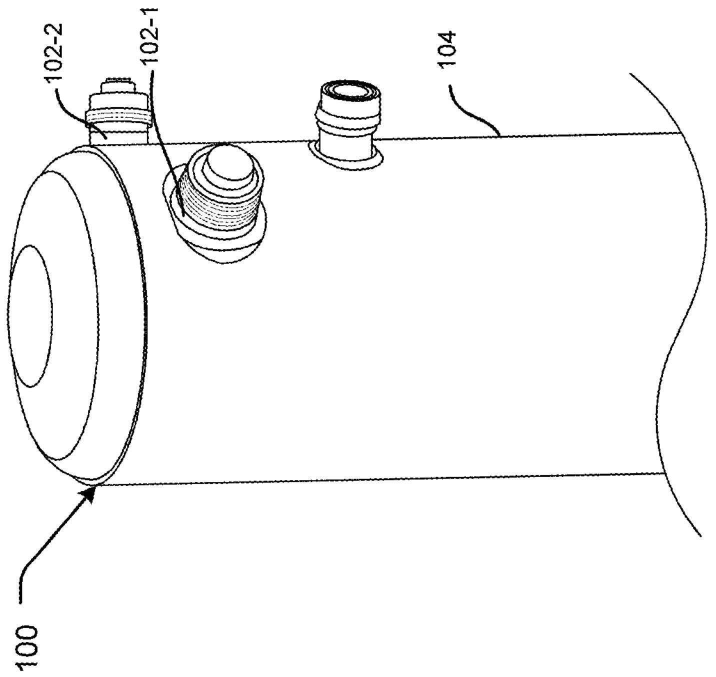
FIG. 1A illustrates an exemplary perspective view of a scroll compressor comprising one or more ports, each fitted with a connector assembly in accordance with one or more embodiments of the subject disclosure.

The following is a detailed description of embodiments of the subject disclosure depicted in the accompanying drawings. The embodiments are in such detail as to clearly communicate the subject disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of the subject disclosure. Described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, described herein may be oriented in any desired direction.

Various ports of the scroll compressor, including the suction port, discharge port, and vapor injection port, traditionally utilize a flanged connection to connect to the refrigerant circuit piping. However, the traditional flanged connection presents several challenges that may compromise the overall reliability and durability of the compressor assembly.

One significant issue arises from the weakness observed in the brazing joint between the compressor tube (extending out of the ports) and the flange connecting tube when subjected to shock and vibration during transport applications. This weakness may lead to failure and, consequently, reduced system performance and reliability. Additionally, achieving the required assembly control to meet design tolerances becomes a challenging task.

Moreover, the alignment of the two connection joints plays an important role in determining the assembly stress. Misalignment while assembling may result in higher assembly stress, further exacerbating the vulnerability of the brazing joint and increasing the risk of failure. The use of flange connections introduces this additional challenge in the form of difficulty in mating the flange connectors, which may lead to additional stress on the assembly, contributing to an increased risk of connection joint failure and piping.

There is therefore a need for a solution to effectively address the challenges associated with scroll compressors, by providing a simple and improved connector assembly for the scroll compressors, which facilitates connection of pipes or conduits to one or more ports of the scroll compressor.

Figure 1B:
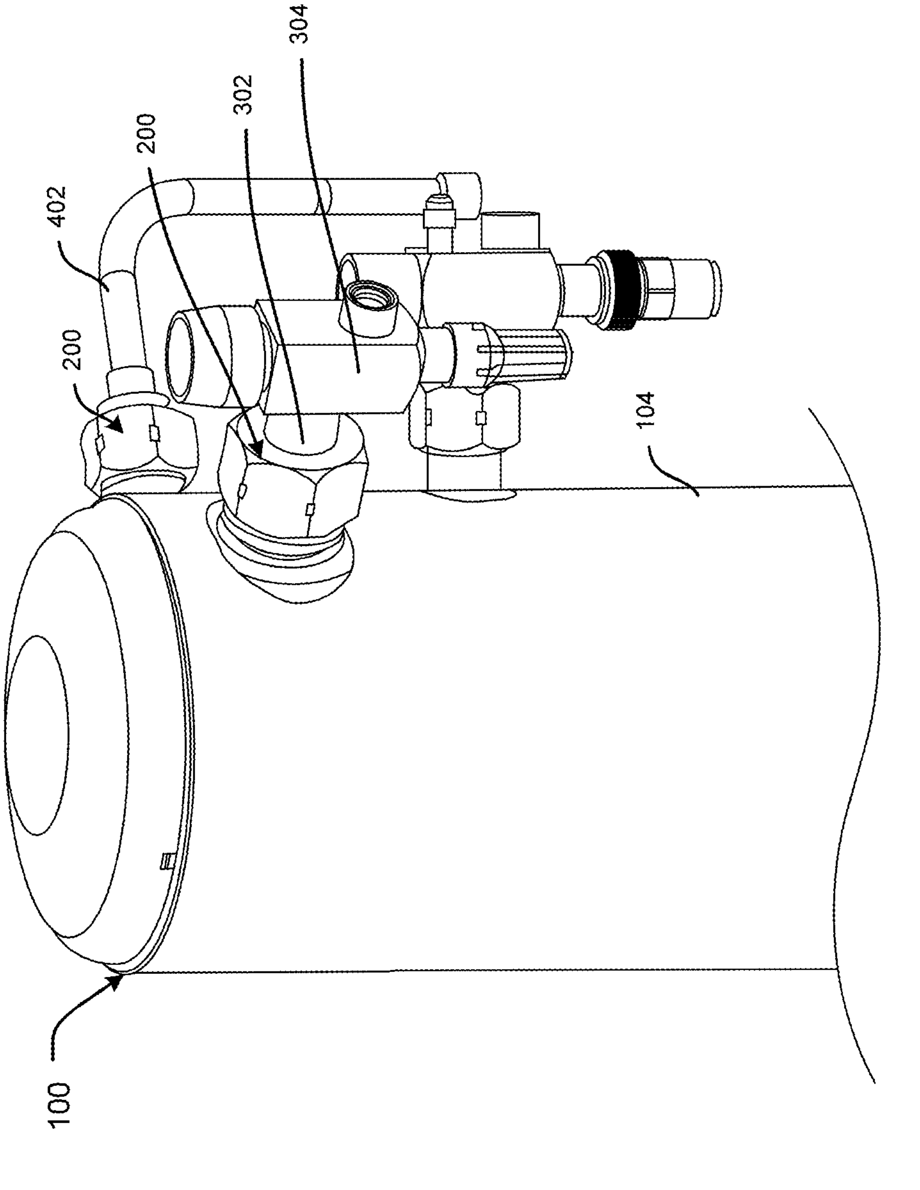
FIG. 1B illustrates an exemplary perspective view of the scroll compressor of FIG. 1A having a service valve and other conduits connected to the ports of the compressor via the connector assembly in accordance with one or more embodiments of the subject disclosure.
Figure 2:
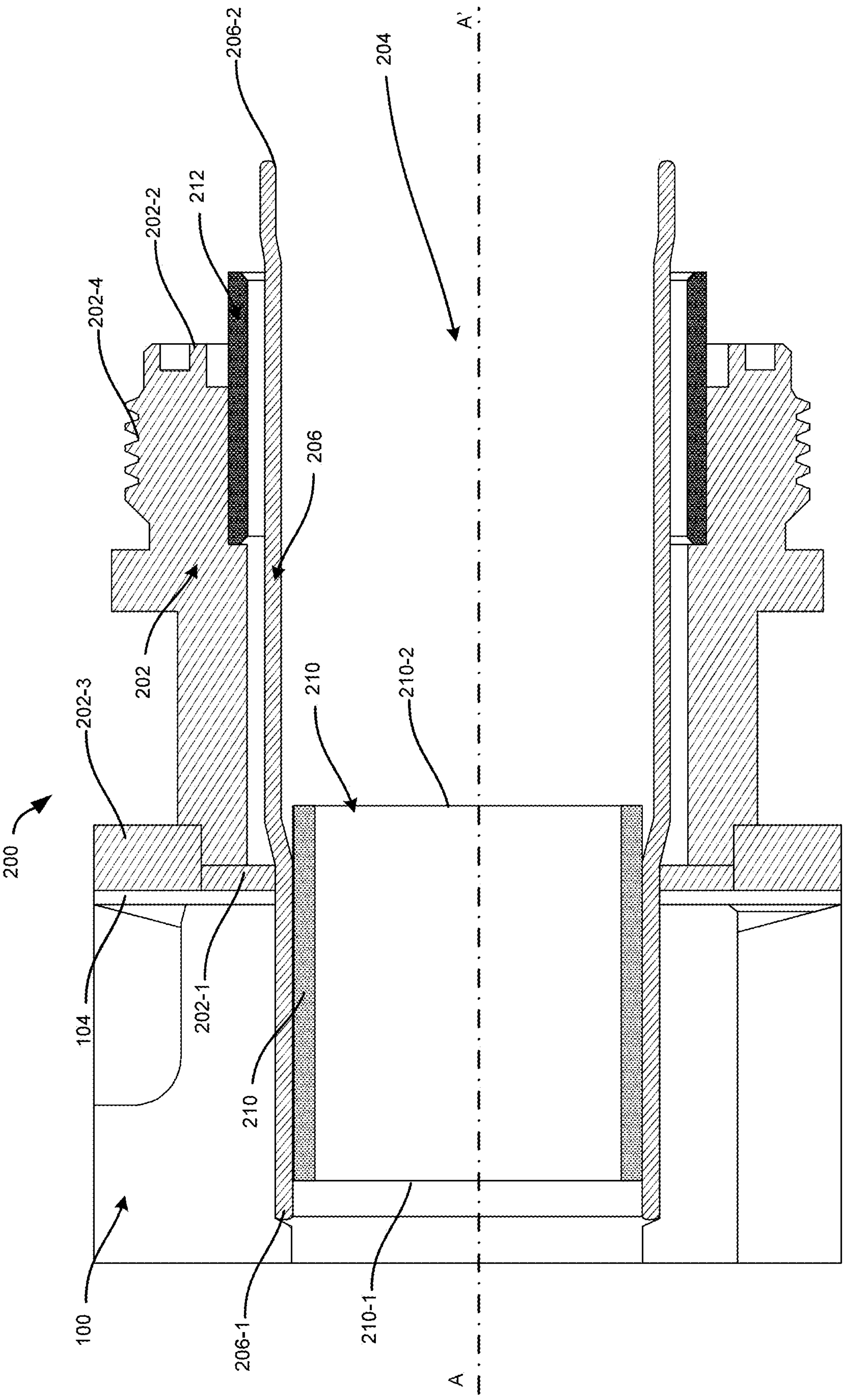
FIG. 2 illustrates an exemplary cross-section view of the connector assembly in accordance with one or more embodiments of the subject disclosure

Referring to FIG. 1A to 2, a connector assembly 200 for a scroll compressor 100 is disclosed. The connector assembly enables the fitment of conduits or piping to one or more ports, including a suction port 102-1, and a vapor injection port (or economizer port) 102-2 (collectively designated as 102, herein) associated with the scroll compressor 100 (referred to as compressor 100, herein). In one or more embodiments, referring to FIG. 2, the connector assembly 200 (also referred to as assembly, herein) can include an adaptor 202 (also referred to as fitting 202, herein) having a first end 202-1 configured to be attached to an outer surface 104 of the compressor 100 at each of ports of the compressor 100, and a second end 202-2 (opposite to the first end) configured to be connected to a connecting end of a conduit to be fluidically connected to the corresponding port 102. In one or more embodiments, the adaptor 202 may be a rotalock adaptor or a service valve adaptor.

Figure 3:
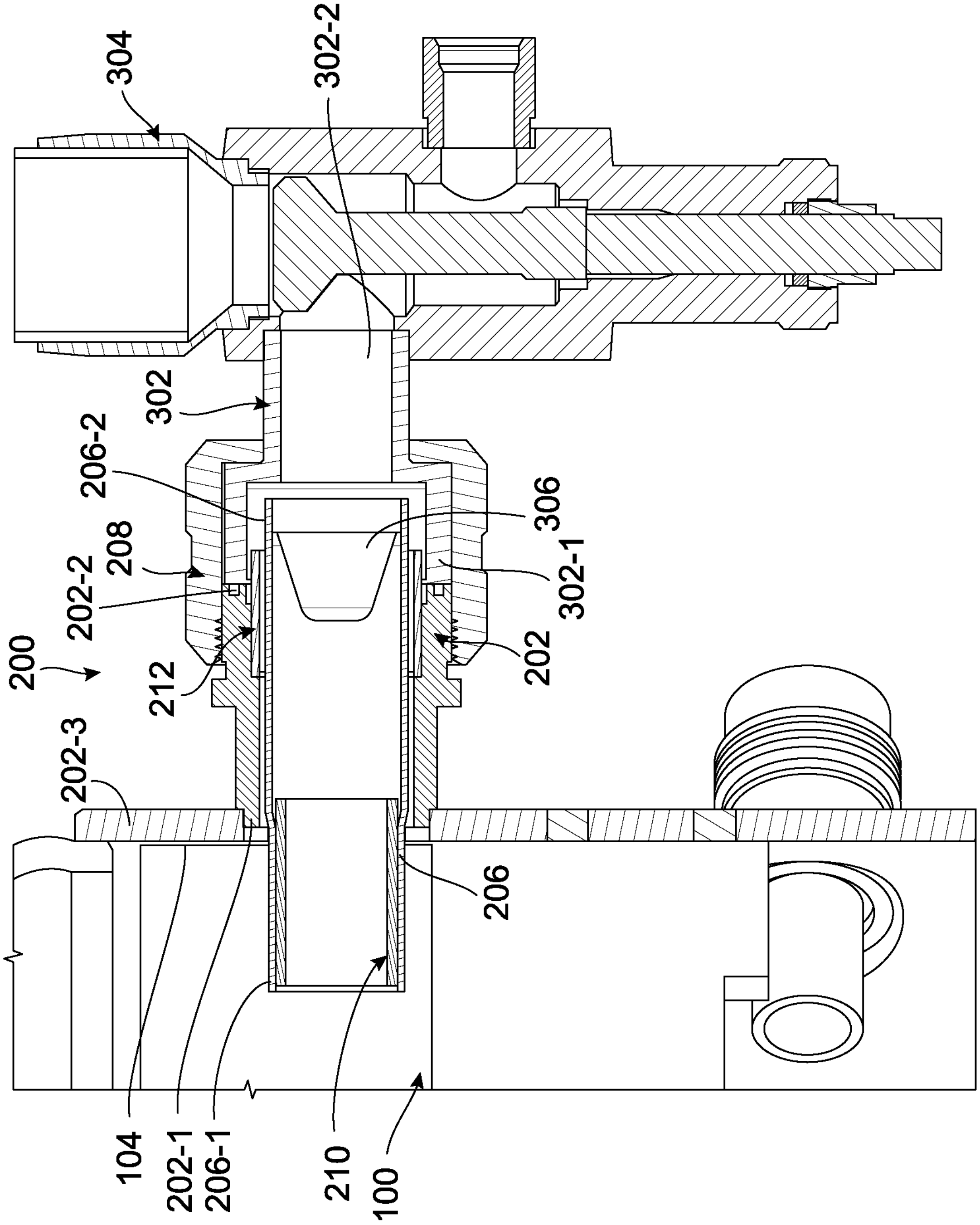
FIG. 3 illustrates an exemplary cross-section view depicting the connection of a first conduit associated with the service valve with the suction port of the compressor via the connector assembly in accordance with one or more embodiments of the subject disclosure.

In one or more embodiments, referring to FIG. 3, the assembly 200 can enable fitment of a (first) conduit 302 associated with a service valve 304 to the suction port 102-1 of the compressor 100. A first (connecting) end 302-1 of the first conduit 302 can be connected to the second end 202-2 of the adaptor 202 and a second end 302-2 of the first conduit 302 can be connected with the service valve 304, with a suction screen 306 configured at the connecting end 302-1 of the first conduit 302.

Figure 4:
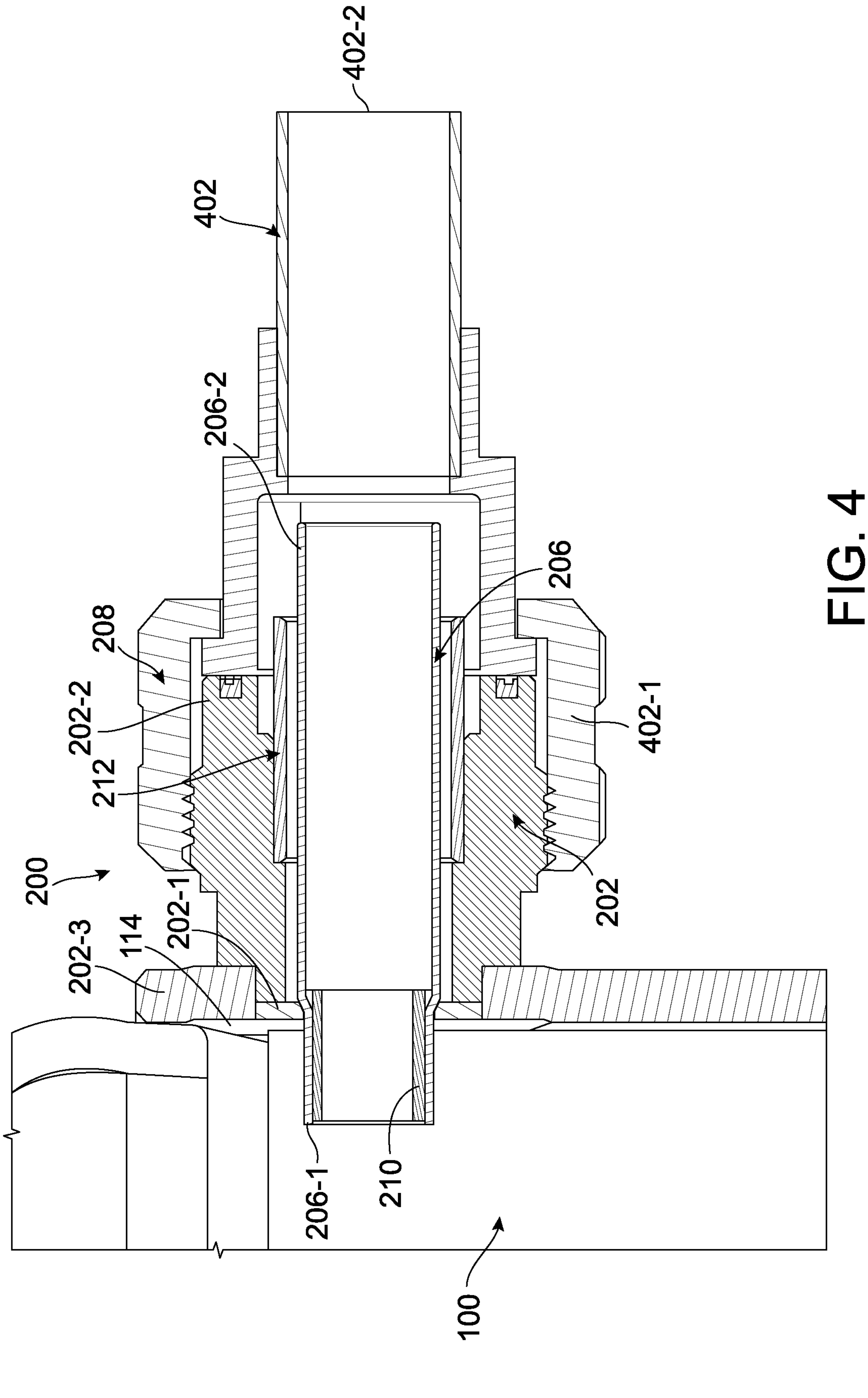
FIG. 4 illustrates an exemplary detailed cross-section view depicting the connection of a second conduit associated with an economizer with the vapor injection port of the compressor via the connector assembly in accordance with one or more embodiments of the subject disclosure.

Further, in one or more embodiments, referring to FIG. 4, the assembly 200 can enable the fitment of a (second) conduit 402 associated with an economizer to the vapor injection port 102-2 of the compressor 100. A first (connecting) end 402-1 of the second conduit 402 can be connected to the second end 202-2 of the adaptor 202 and a second end 402-2 of the second conduit 402 can be connected to the economizer (not illustrated here).

As illustrated, the compressor 100 can include a separate connector assembly 200 for each of the suction port 102-1, and the vapor injection port 102-2, however, the detailed construction of the connector assembly 200 has been collectively explained herein for the port(s) 102 of the compressor 100 for the sake of brevity.

Referring back to FIG. 2, in one or more embodiments, the adaptor 202 of the assembly can include a housing that can be rotationally symmetric about its longitudinal axis A-A' and has a bore-hole 204 extending longitudinally along the longitudinal axis A-A' between the first end 202-1 and the second end 202-2 of the housing. The first end 202-1 of the adaptor 202 can be attached to the outer surface 104 of the compressor 100 at the port(s) 102 of the compressor 100 such that the longitudinally extending bore-hole 204 of the adaptor 202 remains in line and fluidically connected to the corresponding ports) 102.

The assembly 200 can further include a first tube 206 extending coaxially through the bore-hole 204 of the adaptor 202 via the second end 202-2 of the adaptor 202 such that the first end 206-1 of the first tube 206 extends at least partially within an inner chamber of the compressor 100 via the corresponding port 102 and a second end 206-2 of the first tube extends at least partially outside of the second end 202-2 of the adaptor 202.

In one or more embodiments, as illustrated in FIGS. 3 and 4, a connecting end of the (first and/or second) conduit 302, 402 (to be fluidically connected to the corresponding port (suction port 102-1 and/or vapor injection port 102-2)) can be coaxially connected to the second end 206-2 of the first tube 206 and further secured to the first tube 206 and the adaptor 202 using a fastener 208 such as but not limited to a flare nut. In one or more embodiments, the connecting end of the conduit 302, 402 can be coaxially connected to the second end 206-2 of the first tube 206, such that the second end 206-2 of the first tube 206 extends at least partially within the conduit 302, 402.

Referring back to FIG. 2, in one or more embodiments, the assembly 200 can include a second tube 210 of a first predefined length and radius coaxially disposed within the first end 206-1 of the first tube 206. The second tube 210 can have a length and radius substantially smaller than the length and radius of the first tube 206 such that the second tube 210 remains within the first tube 206, adjacent to an inner rim of the port 102 of the compressor 100, however, the second tube 210 may have a length greater than the thickness of the inner rim of the corresponding port 102 such that the two ends 210-1, 210-2 remain on either sides of the rim. In one or more embodiments, the second tube 210 can be made of metal, but is not limited to the like, that can be configured to be expanded within the first tube 206, which can correspondingly keep the first tube 206 in tight fitment with the inner rim of the corresponding port 102. Further, the second tube 210 can be mechanically expanded within the first tube 206 to create a leak-proof connection between the rim of the ports 102 and (second end of) the first tube 206.

In one or more embodiments, the first end 202-1 of the adaptor 202 can include a raised portion 202-3 that can be configured to be welded to the outer surface 104 of the compressor 100 at the one or more ports 102 of the compressor 100. Further, the second end 202-2 of the adaptor 202 can include an external thread 202-4 that facilitates securing the conduit 302, 402 to the second end 202-2 of the adaptor 202 via the flare nut 208. In one or more embodiments, the adaptor 202 and the raised portion 202-3 can be made of stainless steel but is not limited to the like.

In one or more embodiments, the flare nut 208 can be rotatably configured around the connecting end of the conduit 302, 402. Further, the flare nut 208 can include an internal thread complementary to the external thread 202-4 of the adaptor 202, such that the internal thread of the flare nut 208 can rotatably engage and fasten to the external thread 202-4 of the adaptor 202, thereby securing the conduit 302, 402 to the first tube 206 and the adaptor 202. Accordingly, as illustrated in FIGS. 3 and 4, the (first or second) conduits 302, 302 can be fluidically connected and secured to the corresponding (suction or economizer) ports 102 using the flare nut 208 such that the flare nut 208 and/or the second end 202-2 of the adaptor 202 encloses or remains around a connection point or joint between the conduit 302, 402 and the first tube 206. In addition, the conduit 302, 402, and the first tube 206 can be brazed together to create a secured, reliable, and leak-proof connection between the conduit and the compressor 100.

In one or more embodiments, the assembly 200 can include a third tube 212 of a second predefined length and radius extending at least partially within the bore-hole 204 of the adaptor 202 as well as the connected conduit 302, 402 such that the third tube 212 remains disposed in a gap between an outer surface of the second end 206-2 of the first tube 206 and the second end 202-2, and the connected conduit 302, 402, where a Teflon seal/O-ring seal can be used to provide leak tight sealing between the conduit 302, 402 and the adaptor 202. Further, in one or more embodiments, the third tube 212 can be made of copper, but is not limited to the like, where the disposed third tube 212 can be brazed with the first tube 206, and the adaptor 202 to create a secured, reliable, and leak-proof connection between the conduit 302, 402, the assembly 200, and the compressor 100.

The connection joint between the conduit and the first tube is brazed and further enclosed by the adaptor, there may be no stress at the connection point. As a result, the connection joint becomes strong and capable of effectively withstanding shock and vibration during movement or operation of the compressor and associated components, thereby preventing failure and consequently improving the performance and reliability. In addition, the round or rotationally symmetric design of the rotablock adaptor allows the connector assembly to be easily aligned and secured to the conduit in any orientation. This may help reduce the stress on the connection joint as well as the assembly and conduits, thereby strengthening the connection joint and reducing the risk of connection joint failure during assembly and during the movement or operation of the compressor and associated components.

Thus, the subject disclosure overcomes the challenges associated with scroll compressors and existing flag-type connection designs, by providing a simple and improved connector assembly for the scroll compressors, which facilitates in establishment of a strong, reliable, and leak-proof connection between the conduits and various ports of the scroll compressor.

While the subject disclosure has been described with reference to exemplary embodiments, it will be understood by those skilled in the art that various changes may be made and equivalents may be substituted for elements thereof without departing from the scope of the subject disclosure as defined by the appended claims. Modifications may be made to adopt a particular situation or material to the teachings of the subject disclosure without departing from the scope thereof. Therefore, it is intended that the subject disclosure not be limited to the particular embodiment disclosed, but that the subject disclosure includes all embodiments falling within the scope of the subject disclosure as defined by the appended claims.

In interpreting the specification, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A connector assembly for a scroll compressor, the assembly comprising:

an adaptor having a first end configured to be attached to an outer surface of the scroll compressor at one or more ports of the scroll compressor such that a longitudinally extending bore-hole of the adaptor remains in line and fluidically connected to the corresponding port;

a first tube extending coaxially through the bore-hole of the adaptor via a second end of the adaptor such that a first end of the first tube extends at least partially within an inner chamber of the scroll compressor via the corresponding port and a second end of the first tube extends at least partially outside of the second end of the adaptor, wherein a connecting end of a conduit to be fluidically connected to the corresponding port is configured to be coaxially connected to the second end of the first tube and further secured to the first tube and the adaptor using a fastener; and wherein the connector assembly further comprises a second tube of a first predefined length coaxially disposed within the first end of the first tube, and wherein the second tube is configured to be expanded within the first tube and correspondingly keep the first tube in contact with a rim of the corresponding port to create a leak-proof connection between the rim and the first tube.

2. The connector assembly of claim 1, wherein the one or more ports comprise a suction port, and wherein the conduit is associated with and fluidically connected to a service valve.

3. The connector assembly of claim 1, wherein the one or more ports comprise a vapor injection port, and wherein the conduit is associated with and fluidically connected to an economizer.

4. The connector assembly of claim 1, wherein the conduit is assembled to the adaptor using a flare nut.

5. The connector assembly of claim 1, wherein the adaptor comprises a housing that is rotationally symmetric about a longitudinal axis of the adaptor and having the bore-hole extending along the longitudinal axis between a first end and a second end of the housing.

6. The connector assembly of claim 1, wherein the fastener is a flare nut that is rotatably configured around the connecting end of the conduit.

7. The connector assembly of claim 6, wherein the second end of the adaptor comprises an external thread and the flare nut comprises an internal thread adapted to rotatably engage and be fastened to the external threads of the adaptor to secure the conduit to the first tube and the adaptor.

8. The connector assembly of claim 1, wherein the conduit is fluidically connected and secured to the corresponding port using a flare nut such that the flare nut and/or the second end of the adaptor encloses a connection point between the conduit and the first tube.

9. The connector assembly of claim 1, wherein the second tube is made of a metal.

10. The connector assembly of claim 1, wherein the connecting end of the conduit is coaxially connected to the second end of the first tube, such that the second end of the first tube extends at least partially within the conduit.

11. The connector assembly of claim 1, wherein the adaptor is made of stainless steel.

12. The connector assembly of claim 1, wherein the first end of the adaptor is welded to the outer surface of the scroll compressor at the one or more ports of the scroll compressor.

13. The connector assembly of claim 1, wherein the first end of the adaptor comprises a raised portion that is configured to be welded to the outer surface of the scroll compressor at the one or more ports of the scroll compressor.

14. A connector assembly for a scroll compressor, the assembly comprising:

an adaptor having a first end configured to be attached to an outer surface of the scroll compressor at one or more ports of the scroll compressor such that a longitudinally extending bore-hole of the adaptor remains in line and fluidically connected to the corresponding port;

a first tube extending coaxially through the bore-hole of the adaptor via a second end of the adaptor such that a first end of the first tube extends at least partially within an inner chamber of the scroll compressor via the corresponding port and a second end of the first tube extends at least partially outside of the second end of the adaptor, wherein a connecting end of a conduit to be fluidically connected to the corresponding port is configured to be coaxially connected to the second end of the first tube and further secured to the first tube and the adaptor using a fastener; and wherein the connector assembly further comprises a second tube of a second predefined length coaxially disposed in a gap between an outer surface of the second end of the first tube and the second end of the adaptor, and the connected conduit to create a leak-proof connection between the first tube, the adaptor, and the conduit.

15. The connector assembly of claim 14, wherein the second tube extends at least partially within the bore-hole of the adaptor and the connected conduit.

16. The connector assembly of claim 14, wherein the second tube is made of copper, and wherein the second tube is brazed to the conduit, the first tube, and the adaptor.

* * * * *